US005488436A

United States Patent [19]
Choi et al.

[11] Patent Number: 5,488,436
[45] Date of Patent: Jan. 30, 1996

[54] LIQUID CRYSTAL PROJECTOR

[75] Inventors: Soon C. Choi, Kyonggi; Ki U. Jeon, Seoul, both of Rep. of Korea

[73] Assignee: Samsung Electronics Co., Ltd., Kyungki, Japan

[21] Appl. No.: 49,448

[22] Filed: Apr. 20, 1993

[30] Foreign Application Priority Data

Apr. 21, 1992 [KR] Rep. of Korea .................... 92-6651
Sep. 15, 1992 [KR] Rep. of Korea .................... 92-16760
Nov. 30, 1992 [KR] Rep. of Korea .................... 92-22788

[51] Int. Cl.$^6$ .................................................. H04N 9/31
[52] U.S. Cl. .................... 348/751; 348/756; 348/757; 359/49; 353/34
[58] Field of Search .......................... 358/60–63, 231, 358/236; 353/34, 82; 359/40, 41, 49; 348/744, 750, 751, 752, 756, 757, 758, 759, 760, 761, 762, 766; H04N 9/31

[56] References Cited

U.S. PATENT DOCUMENTS 4,864,390 9/1989 McKechnie et al. ................. 358/61
5,196,926 3/1993 Lee .................................... 358/60

Primary Examiner—Victor R. Kostak
Assistant Examiner—Michael H. Lee
Attorney, Agent, or Firm—Sughrue, Mion, Zinn, Macpeak & Seas

[57] ABSTRACT

A liquid crystal projector which splits white light projected from a light source and light-intensity-modulates and synthesizes the split light components to project the synthesized light components onto a screen. The projector includes a dichroic mirror having a light transmittance characteristic in which two color light components of the three color light components being adjacent in spectrum are transmitted, and a dichroic mirror having a light transmittance characteristic in which the remaining color light excluding the two color light components is reflected. The location of the light source is appropriately modified inside the projector. Accordingly, the production cost is reduced, the heat produced by the light source is not exhausted toward the viewers and the projector is miniaturized.

15 Claims, 4 Drawing Sheets

LIQUID CRYSTAL PROJECTOR

BACKGROUND OF THE INVENTION

1. Field of the Invention

The present invention relates to a liquid crystal projector, and particularly to a liquid crystal projector which uses a plurality of transparent liquid crystal panels and dichroic mirrors to split white light projected from a light source, modulate the light intensity of the split light components and color-light-synthesize the intensity-modulated light components which are then projected onto a screen using a projection lens.

2. Background

A known liquid crystal display (LCD) includes a liquid crystal projector which controls the voltage applied to the liquid crystal to adjust the intensity of light transmitted via the liquid crystal so that a video signal is loaded on the transmitted light. In order to realize a color picture, such a liquid crystal projector comprises a color splitting/synthesizing optical system which splits white light into three primary colors and synthesizes the split light components. As such a color splitting/synthesizing optical system, there have been proposed two kinds of structures, one of which uses two X-shaped dichroic mirrors and the other of which uses four planar dichroic mirrors. The former structure is advantageous in that the optical system is small and the distance between the projection lens and liquid crystal is short to reduce the focal length of the projection lens. However, the structure is disadvantageous in that the X-shaped dichroic mirrors are expensive and a plurality of total reflecting mirrors are required for change the light path, thereby increasing production cost.

Meanwhile, compared with the former structure, in the latter structure using four planar dichroic mirrors, the optical system is relatively large and the distance between the projection lens and liquid crystal is long so as to be disadvantageous in reducing the focal length of the projection lens and the projection distance of light. However, since the latter structure is substantially less expensive that the former structure, it is widely used for the color splitting/synthesizing optical system of liquid crystal projector. A conventional liquid crystal having such color splitting/synthesizing optical system using four planar dichroic mirrors will be described with reference to FIGS. 1A–1E.

FIGS. 1A–1E are graphs of light transmittance characteristics of dichroic mirrors, which show the degree of light transmittance of dichroic mirrors with respect to the spectrum of blue light (B), green light (G) and red light (R). For instance, the dichroic mirror having the light transmittance of FIG. 1A transmits blue light (B) and red light (R) and reflects green light (G).

FIG. 2 illustrates a conventional liquid crystal projector, in which liquid crystal panels (LC panel) and three dichroic mirrors are used to color-split, light-intensity-modulate and synthesize projected light. In FIG. 2, light paths are illustrated by the solid line for blue light (B), the dotted line for green light (G) and the one-dot-one-dash line for red light (R), as indicated. This correlation is also applied in other drawings.

Referring to FIG. 2, the liquid crystal projector includes a light source 11 for generating white light, a color splitting/synthesizing system consisting of four dichroic mirrors 12–15 and a pair of reflecting mirrors 16 and 17, a projection lens 18 for projecting light generated from the color splitting/synthesizing system onto a screen 25, and a fan 29 positioned behind the light source 11. Further, the projector comprises three LC panels 19, 20 and 21 for modulating the light intensity of each of split blue light (B), green light (G) and red light (R), and three condensers 22, 23 and 24 employed for efficient use of the three LC panels 19, 20 and 21. Since light source 11 generates intense light to prevent the picture from darkening due to the loss of light as the light transmits through the LC panels, the fan 29 is installed behind the light source 11 to discharge the heat generated from light source lamp 11 outside the liquid crystal projector.

The dichroic mirrors of FIG. 2 have the following light transmittance characteristics. The first dichroic mirror 12 reflects only the red light (R) of the white light generated from lamp 11; the second and third dichroic mirrors 13 and 14 reflect only blue light (B); and the fourth dichroic mirror 15 reflects only green light (G). In other words, the first dichroic mirror 12 has the light transmittance characteristic of FIG. 1C, the second and third dichroic mirrors 13 and 14 have the light transmittance characteristic of FIG. 1E and the fourth dichroic mirror 15 has the light transmittance characteristic of FIG. 1A.

However, since, due to the characteristics of a coater, coating is performed by applying a large amount of coating material at a time, it is undesirable in regard to production costs to have a large number of dichroic mirrors in the color splitting/synthesizing optical system. Further, with conventional liquid crystal projectors, the dichroic mirror having the light transmittance characteristic of FIG. 1A requires more rigid coating requirements than that required by the other dichroic mirrors having the light transmittance characteristics of FIGS. 1B–1E. Therefore, the presence of the fourth dichroic mirror 15 substantially increases the overall cost of the system.

Further, in the conventional projector, since the light source for generating white light is placed behind the color splitting/synthesizing optical system, the heat produced from the light source lamp is directly transmitted to a viewer and the projector is very large.

SUMMARY OF THE INVENTION

Therefore, it is an object of the present invention provide a liquid crystal projector which uses the minimum number of dichroic mirrors having spectral transmittance characteristic in which a coating mode is less rigid than the dichroic mirrors of the conventional projector so as to reduce production cost.

It is another object of the present invention to provide a liquid crystal projector in which the position of a light source is appropriately adjusted so that the heat generated from the light source is not directed toward the viewer and the projector is miniaturized.

To accomplish these and other objects, there is provided a liquid crystal projector wherein the color splitting/synthesizing optical system consists of a dichroic mirror having light transmittance characteristics where, among the three color light components used in light-intensity modulation, two nearby color light components on the spectrum are transmitted, and the remaining color light is reflected.

Further, there is provided a liquid crystal projector which splits white light projected from a light source and light-intensity modulates and synthesizes the split light components to project the synthesized light components onto a screen, comprising first and third dichroic mirrors for transmitting only the first color light from white light and reflecting the second and third color light components, second and fourth dichroic mirrors for transmitting only the third color light of white light and reflecting the first and second color light components. The dichroic mirrors are disposed in such a manner that the projected light from the light source is reflected and transmitted via the first dichroic mirror, the reflected light of the first dichroic mirror is transmitted and reflected by the second dichroic mirror, the reflected light of the second dichroic mirror is reflected light of the second dichroic mirror is reflected by the third and fourth dichroic mirrors to reach the projection lens, the transmitted light of the second dichroic mirror is transmitted via the fourth dichroic mirror to reach the projection lens and the transmitted light of the first dichroic mirror is transmitted via the third dichroic mirror and reflected by the fourth dichroic mirror to reach the projection lens.

Further, the present invention provides a liquid crystal projector comprising first and third dichroic mirror for transmitting only the first color light from white light and reflecting the second and third color light components, a second dichroic mirror for reflecting only the third color light of white light and transmitting the first and second light components, and a fourth mirror for synthesizing the light components color-split by the dichroic mirrors to send the synthesized light components to a projection lens. These dichroic mirrors are disposed in such a manner that the projected light from the light source is reflected and transmitted via the first dichroic mirror, the reflected light of the first dichroic mirror is transmitted and reflected by the second dichroic mirror, the reflected light of the second dichroic mirror reaches the fourth dichroic mirror, the transmitted light of the second dichroic mirror is reflected by the third dichroic mirror to reach the fourth dichroic lens, and the transmitted light of the first dichroic mirror is transmitted via the third dichroic mirror to reach the fourth dichroic mirror.

Furthermore, the present invention provides a liquid crystal projector comprising first and third dichroic mirrors for reflecting only the first color light component from white light and transmitting the second and third color light components a second dichroic mirror for transmitting only the third color light component of the white light and reflecting the first and second color light components and a fourth mirror for synthesizing the light components color-split by the dichroic mirrors to send the synthesized light components to a projection lens. These dichroic mirrors are disposed in such a manner that the projected light from a light source is reflected and transmitted via the first dichroic mirror, the reflected light of the first dichroic mirror is reflected by the third dichroic mirror, the transmitted light of the first dichroic mirror is reflected and transmitted via the second dichroic mirror, the reflected light of the second dichroic mirror is transmitted via the third dichroic mirror to reach the fourth dichroic lens, and the transmitted light of the first dichroic mirror reaches the fourth dichroic mirror.

In the present invention, in order to properly direct the heat produced by the light source and to miniaturize the apparatus, the light source is located in an external space of the optical system which is created by modifying the arrangement of dichroic mirrors placed near the screen.

DETAILED DESCRIPTION OF THE INVENTION

Figure 3:
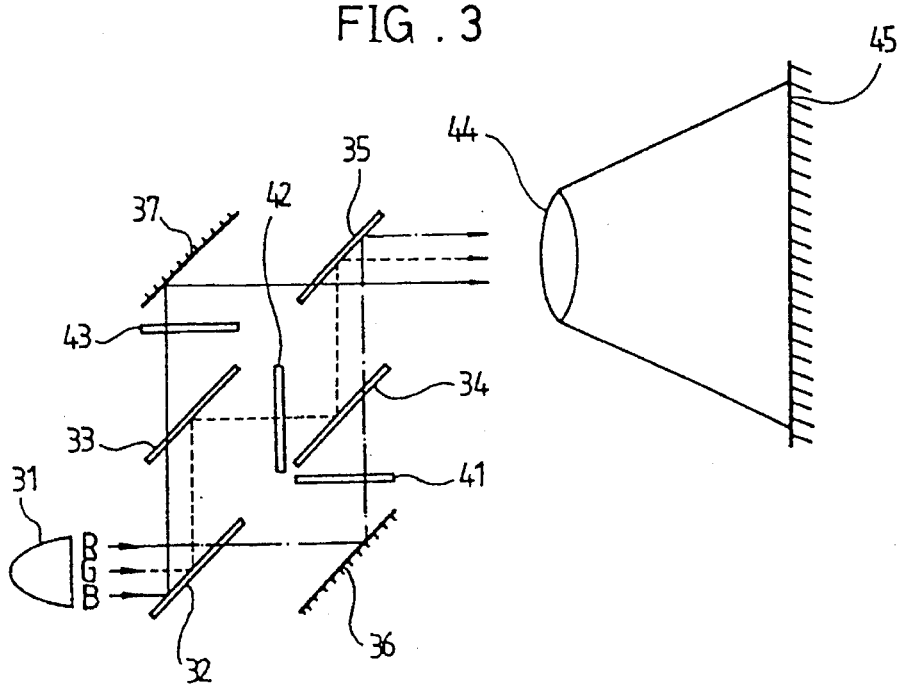
FIG. 3 is a schematic view of one embodiment of a liquid crystal projector of the present invention.

Referring to FIG. 3 the liquid crystal projector of the present invention comprises a plurality of transparent thin LC panels 41, 42 and 43 for modulating the intensity of white light projected from a light source 31, a plurality of dichroic mirrors 32, 33, 34 and 35 and total reflecting mirrors 36 and 37 which together form a color splitting/synthesizing optical system. In addition, the projector has a projection lens 44 for receiving synthesized light and projecting it onto a screen.

First and second total reflecting mirrors 36 and 37 are disposed between first and third dichroic mirrors 32 and 34 and between second and fourth dichroic mirrors 33 and 35, respectively. Among the dichroic mirrors 32–35, first and third dichroic mirrors 32 and 34 have the light transmittance characteristic of FIG. 1D, and second and fourth dichroic mirrors 33 and 35 have the light transmittance characteristic of FIG. 1B. First dichroic mirror 32 is located in front of light source 31 and second dichroic mirror 33 is disposed to transmit and reflect the light reflected by first dichroic mirror 32. Third dichroic mirror 34 is disposed to reflect the light reflected by second dichroic mirror 33 and transmit the light transmitted via first dichroic mirror 32. Fourth dichroic mirror 35 is disposed to transmit the transmitted light of second dichroic mirror 33 and reflect the reflected light and transmitted light of third dichroic mirror 34. Projection lens 44 is disposed to project the light projected by fourth dichroic mirror 35 onto screen 45. First and second total reflecting mirrors 36 and 37 are placed between first and second dichroic mirrors 32 and 34 and between second and fourth dichroic mirrors 33 and 35, as illustrated in FIG. 3.

Thin LC panels 41, 42 and 43 for modulating red light, green light and blue light according to a voltage corresponding to a video signal, are respectively placed between first total reflecting mirror 36 and third dichroic mirror 34, between second and third dichroic mirrors 33 and 34, and between second dichroic mirror 33 and second total reflecting mirror 37, as also illustrated in FIG. 3.

White light from light source 31 is projected and red light thereof is split by first dichroic mirror 32 which transmits red light only. The red light transmitted via first dichroic mirror 32 passes through first total reflecting mirror 36, LC panel 41 and third dichroic mirror 34 which also transmits red light only, to reach fourth dichroic mirror 35. The red light having arrived at fourth dichroic mirror 35 which transmits blue light only is reflected thereby and directed toward projection lens 44. When the remaining blue and green lights reflected by first dichroic mirror 32 strike second dichroic mirror 33, the blue light is transmitted and green light is reflected according to the light transmittance characteristic of second dichroic mirror 33. The blue, light component having passed through the second dichroic mirror 33 is transmitted by the fourth dichroic mirror 35, which transmits blue light only, via LC panel 43 and second total reflecting mirror 37, and is directed toward projection lens 44. The green light reflected by second dichroic mirror 33 is reflected again by third dichroic mirror 34, which transmits red light only, via LC panel 42, and reaches fourth dichroic mirror 35. The green light is then reflected by the fourth dichroic mirror and directed toward projection lens 44.

The three color light components are split and modulated before finally reaching the fourth dichroic mirror 35 travelling along three different light paths. These components are synthesized by the fourth dichroic mirror 35 and strike projection lens 44 in parallel to be projected onto screen 45 via projection lens 44. This forms an enlarged picture. In the above description, the direction of projection light may be modified by changing the light transmitting characteristic of the fourth dichroic mirror 35 into that of FIG. 1E.

Figure 4:
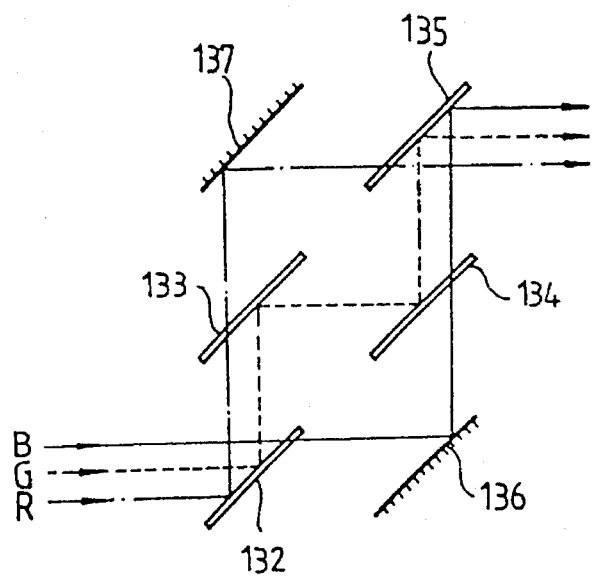
FIG. 4 is a schematic view showing the arrangement of the dichroic mirrors used in a color splitting/synthesizing optical system according to another embodiment of the present invention.

Referring to FIG. 4, the color splitting/synthesizing optical system has basically the same arrangement and configuration as that of FIG. 3 with the following exception. As compared to the embodiment of FIG. 3, in the FIG. 4 embodiment first and third dichroic mirrors 132 and 134 have the light transmittance characteristic in which only blue light is transmitted and second and fourth dichroic mirrors 133 and 135 have the light transmittance characteristic in which only red light is transmitted.

In this embodiment, red light (R) is reflected by first dichroic mirror 132 and transmitted via second and fourth dichroic mirror 133 and 135 to arrive at projection lens 44. Blue light (B) is transmitted via first and third dichroic mirrors 132 and 134 and reflected by fourth dichroic mirror 135 to reach projection lens 44. Green light (G) is reflected by all the first-fourth dichroic mirrors 132, 133, 134 and 135 to reach projection lens 44. Accordingly, although the paths of the blue and red light components are reverse to the paths in the FIG. 3 embodiment, the embodiment of FIG. 4 accomplishes the same result.

Figure 1A:
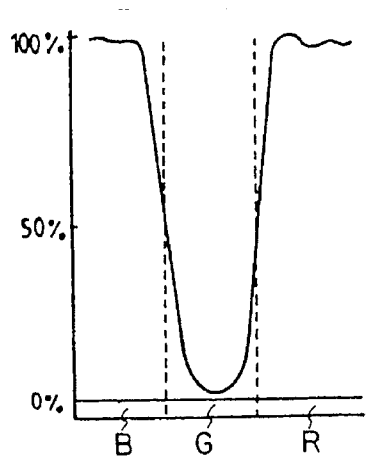
FIGS. 1A–1E are graphs of light transmittance characteristics of dichroic mirrors.
Figure 5:
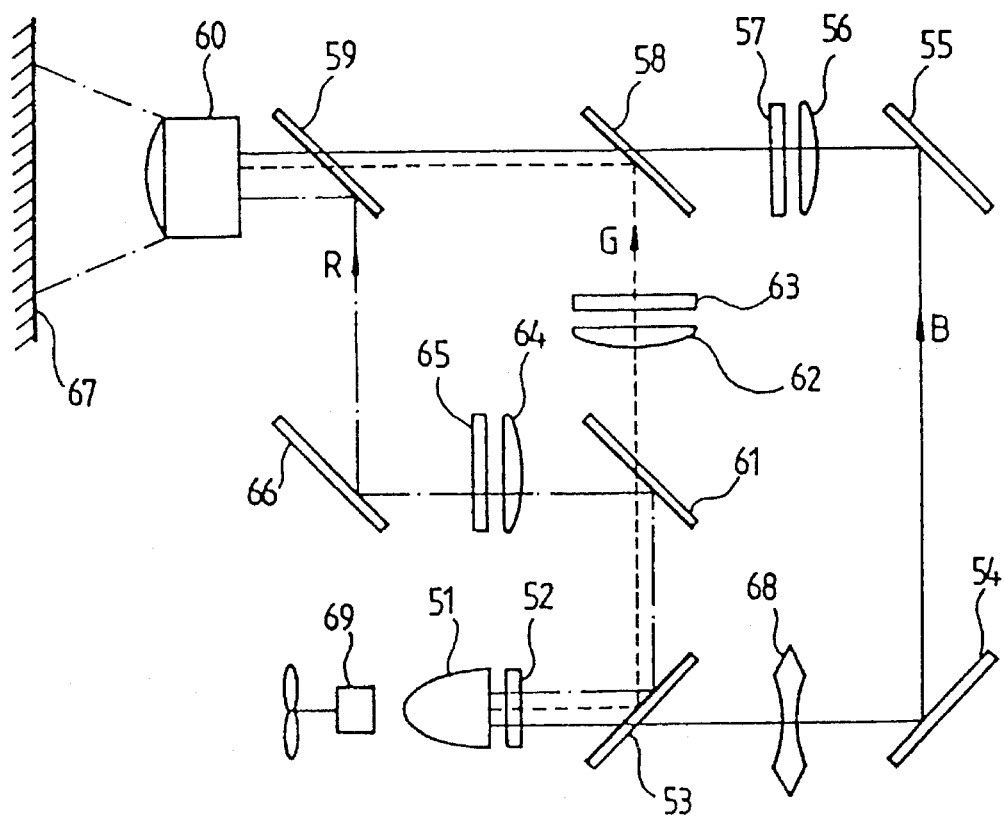
FIGS. 5–7 are schematic views of still another embodiment of the liquid crystal projector of the present invention.

FIG. 5 illustrates another embodiment of the liquid crystal projector according to the present invention. In FIG. 5, the projector has dichroic mirrors having the light transmittance characteristics of FIGS. 1B and 1C which are easier to manufacture than the dichroic mirror having the light transmittance characteristic of FIG. 1A. The light source is located on the side of the projection lens.

Figure 1B:
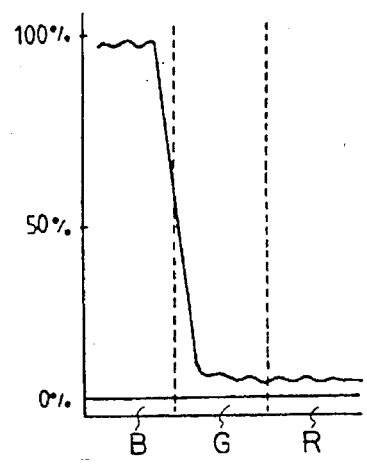
Figure 1C:
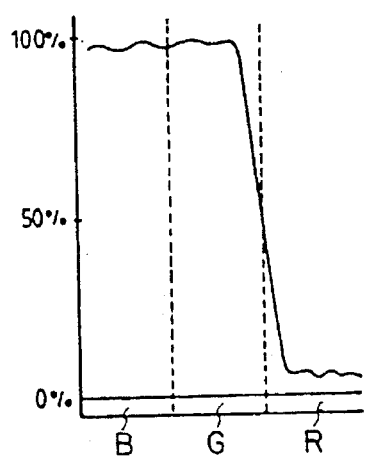

The liquid crystal projector of FIG. 5 comprises a light source 51 placed near screen 67 for generating white light, a plurality of reflecting mirrors 54, 55 and 66, first and third dichroic mirrors 53 and 58 having the light transmittance characteristic of FIG. 1B, and second and fourth dichroic mirrors 61 and 59 having the light transmittance characteristic of FIG. 1C. Further, the liquid crystal projector includes a projection lens 60 for adjusting the focus of the light projected onto screen 67, three LC panels 57, 63 and 65 for modulating the intensity of the blue light (B), green light (G) and red light (R) which are obtained from splitting the white light, and three condensers 56, 62 and 64 for controlling the proceeding direction of light passing therethrough.

The dichroic mirrors are disposed so that, when the light components projected from light source 51 are reflected and transmitted via first dichroic mirror 53, the reflected light components of first dichroic mirror 53 are reflected and transmitted via second dichroic mirror 61. The transmitted light of first dichroic mirror 53 strikes third dichroic mirror 58 via first and second total reflecting mirrors 54 and 55. The transmitted light of second dichroic mirror 61 is reflected by third dichroic mirror 58 and transmitted via fourth dichroic mirror 59. The reflected light of second dichroic mirror 61 is reflected by third and fourth dichroic mirrors 66 and 59. Transparent LC panels 57, 63 and 65 and condensers 56, 62 and 64 are disposed between second total reflecting mirror 55 and third dichroic mirror 58, between second and third dichroic mirrors 61 and 58, and between second dichroic mirror 61 and third total reflecting mirror 66, respectively. A correction lens 68 is placed between first dichroic mirror 53 and first total reflecting mirror 54. An optical filter 52 for transmitting only visible light is disposed between light source 51 and first dichroic mirror 53. A fan 69 is installed on the side of light source 51 which is closest to the screen.

According to such a configuration, only the visible light generated by light source 51 is transmitted via optical filter 52 to strike the first dichroic mirror 53. The blue light (B) of the visible light is then split by first dichroic mirror 53, which transmits blue light component only, from the red (R) and green (G) light. Thereafter, the blue light (B) is incident on correction lens 68. As shown in FIG. 5, since the light path of the reflected light components of first dichroic mirror 53 and the light path of the transmitted light component of first dichroic mirror 53 are different, if the white light projected from light source lamp 51 is not perfectly parallel, the red light (R), green light (G), and blue light (B), which are formed on screen 67, would not be precisely coincident so that the sharpness of picture would be decreased. However, since an aspherical correction lens 68 is installed between first dichroic mirror 53 and first total reflecting mirror 54 so as to adjust the proceeding direction of light, this problem associated with the different light paths is prevented.

The blue light (B) passing through the correction lens 68 is then reflected by first and second total reflecting mirrors 54 and 55, passes through condenser 56, and is light-intensity-modulated by LC panel 57 which loads a B-video signal on the blue light. The blue light containing the video signal according to the light-intensity modulation is transmitted via third dichroic mirror 58, which transmits blue light only, to strike fourth dichroic mirror 59.

The reflected light of first dichroic mirror 53 is color-split so that the red light (R) is reflected by second dichroic mirror 61 and the green light (G) is transmitted via dichroic mirror 61. Green light (G) having passed through the second dichroic mirror 61 passes through LC panel 63, which applies a G-video signal using condenser 62 and light-intensity modulation, and is reflected by third dichroic mirror 58 to proceed to fourth dichroic mirror 59. Red light (R) reflected by second dichroic mirror 61 passes through condenser 64 and LC panel 65, which loads a R-video signal on the transmitted red light, is reflected by third total reflecting mirror 66 to proceed to fourth dichroic mirror 59. The three color-split lights having reaches fourth dichroic mirror 59 after being color split and light-intensity modulated along three different light paths are color-light-synthesized by fourth dichroic mirror 59 to strike projection lens 60. Specifically, the red light is reflected by fourth dichroic mirror 59 and the green and blue lights are transmitted therethrough, to strike projection lens 60. Projection lens 60 has a plurality lenses for adjusting the magnification and focus of picture to thereby control the incident light to form an enlarged picture on screen 67.

The heat produced by the light source 51 is discharged by fan 69, installed behind the light source 51, in the direction of screen 67. Thus, the heat of lamp 51 is not transmitted to a viewer who is positioned neat the back portion of the liquid crystal projector.

Another embodiment of the present invention will be described below again with the reference to the above mentioned FIG. 5. This embodiment uses dichroic mirrors having the light transmittance characteristics of FIGS. 1D and 1E.

The apparatus of this embodiment has the same configuration as that of FIG. 5. However, in contrast to the FIG. 5 embodiment, according to this embodiment of the present invention, first and third dichroic mirrors 53 and 58 have the light transmittance characteristic of FIG. 1D which transmits red light components only and second and fourth dichroic mirrors 61 and 59 have the light transmittance characteristic of FIG. 1E which transmits green and red light only. That is, in FIG. 5 the solid line shown therein would be changed to indicate a red light (R) and the one-dot-one-dash line would be changed to indicate blue light (B).

The light paths of this embodiment are as follows. Red light (R) is transmitted via first dichroic mirror 53, reflected by first and second total reflecting mirrors 54 and 55, and transmitted via third and fourth dichroic mirrors 58 and 59 to reach projection lens 60. The green light (G) has the same path as that of FIG. 5. the blue light (B) is reflected by first dichroic mirror 53, second dichroic mirror 61, third total reflecting mirror 66 and fourth dichroic mirror, to reach projection lens. In other words, the embodiment using the light transmittance characteristics of FIGS. 1D and 1E produces the same result as that of FIG. 3, while having the reversed paths for the blue light (B) and red light (R) with respect to those of FIG. 3.

Figure 6:
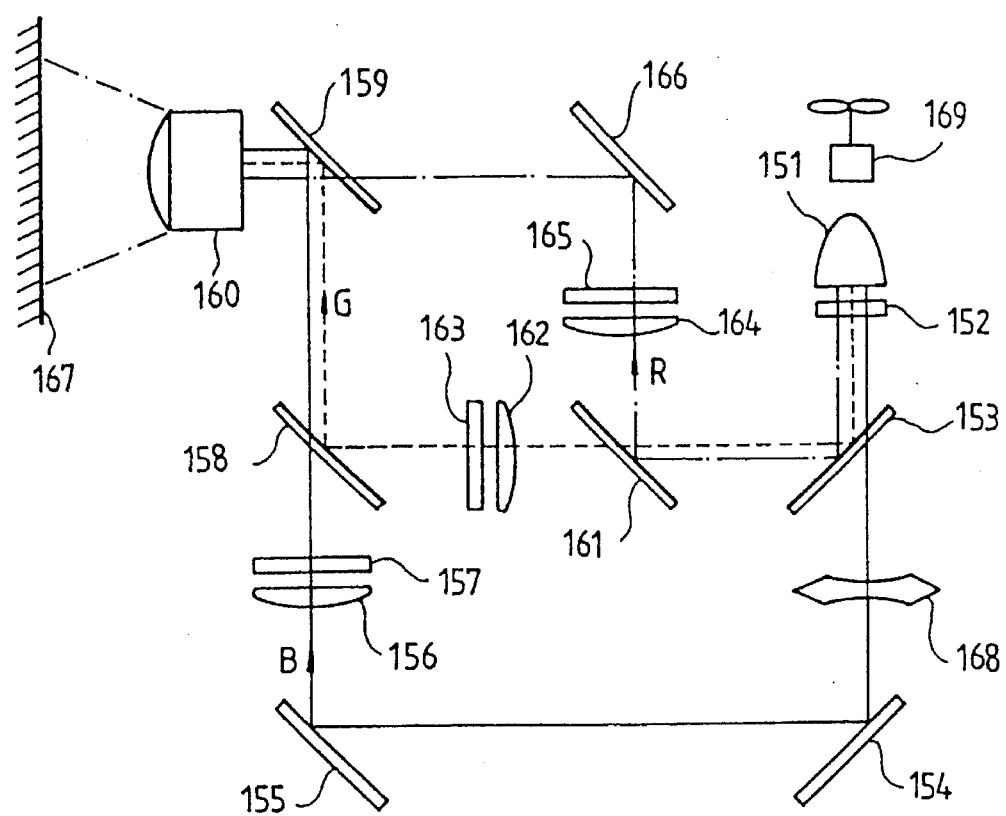

FIG. 6 illustrates another embodiment of the liquid crystal projector of the present invention.

The projector of FIG. 6 is constructed in such a manner that the projector of FIG. 5 is rotated by 90 clock-wise, and is symmetric with respect to a perpendicular axis. Due to the similarities between this embodiment and the FIG. 5 embodiment, the description of the configuration of the FIG. 6 embodiment will be omitted. However, dichroic mirrors 153, 161, 158, 159 have the following light transmittance characteristics which are different from those of FIG. 5. First and third dichroic mirrors 153 and 158 have the light transmittance characteristic of FIG. 1B which transmits blue light only. Second dichroic mirror 161 has the light transmittance characteristic of FIG. 1C which reflects red light only. Fourth dichroic mirror 159 has the light transmittance characteristic of FIG. 1D which transmits red light only.

In the projector of FIG. 6, LC panels 157, 163 and 165, condensers 156, 162 and 164 and correction lens 168 have the same functions as those of the aforementioned embodiments and therefore there description will be omitted. Blue light (B) is transmitted via first dichroic mirror 153, reflected by first and second total reflecting mirrors 154 and 155, and transmitted via third dichroic mirror 158 to reach fourth dichroic mirror 159. Green light (G) is reflected by first dichroic mirror 153, transmitted via second dichroic mirror 161, and reflected by third dichroic mirror 158 to reach fourth dichroic mirror 159. Red light (R) is reflected by first and second dichroic mirrors 153 and 161 and third total reflecting mirror 166 to reach fourth dichroic mirror 159.

Figure 1D:
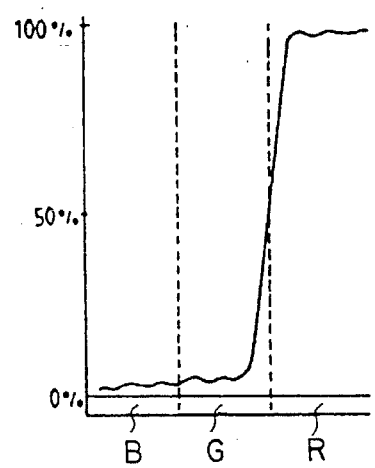

When white light projected from light source lamp 151 reaches fourth dichroic mirror 159 after being color-split and light-intensity-modulated, fourth dichroic mirror 159, having the light transmittance characteristic of FIG. 1D, reflects blue light (B) and green light (G) from third dichroic mirror 158 and transmits red light (R) reflected by third total reflecting mirror 166, to direct the light components 40 to projecting lens 160. Accordingly, the projector of FIG. 6 using dichroic mirrors having the light transmittance characteristics of FIGS. 1B, 1C and 1D forms a picture on screen 167 using projection lens 160 in the same manner as that of FIG. 5.

Figure 1E:
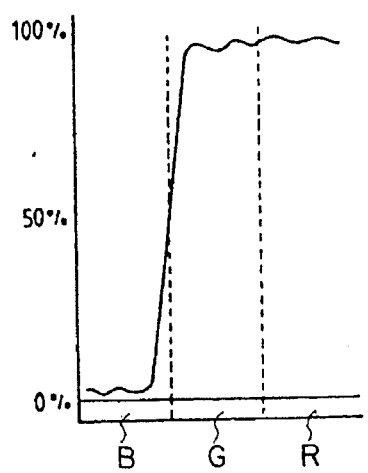
Figure 2:
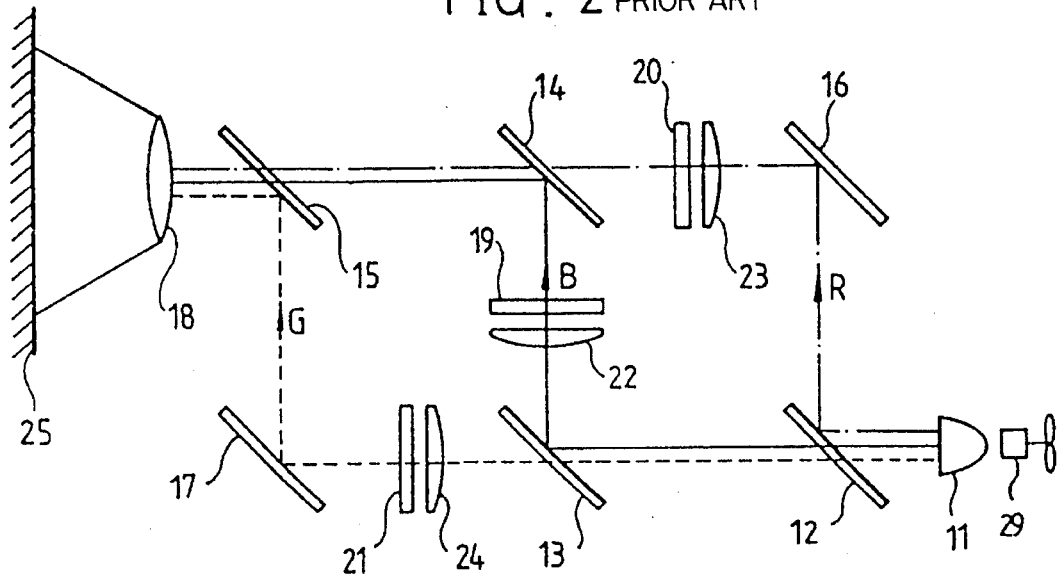
FIG. 2 is a schematic view of a conventional liquid crystal projector.

As an alternative to the FIG. 6 embodiment, a liquid crystal projector is constructed in such a manner that first and third dichroic mirrors 153 and 158 have the light transmittance characteristic of FIG. 1D which transmits red light only, second dichroic mirror 161 has the light transmittance characteristic of FIG. 1E which reflects blue light only and fourth dichroic mirror 159 has the light transmittance characteristic of FIG. 1B which transmits blue light only.

Figure 7:
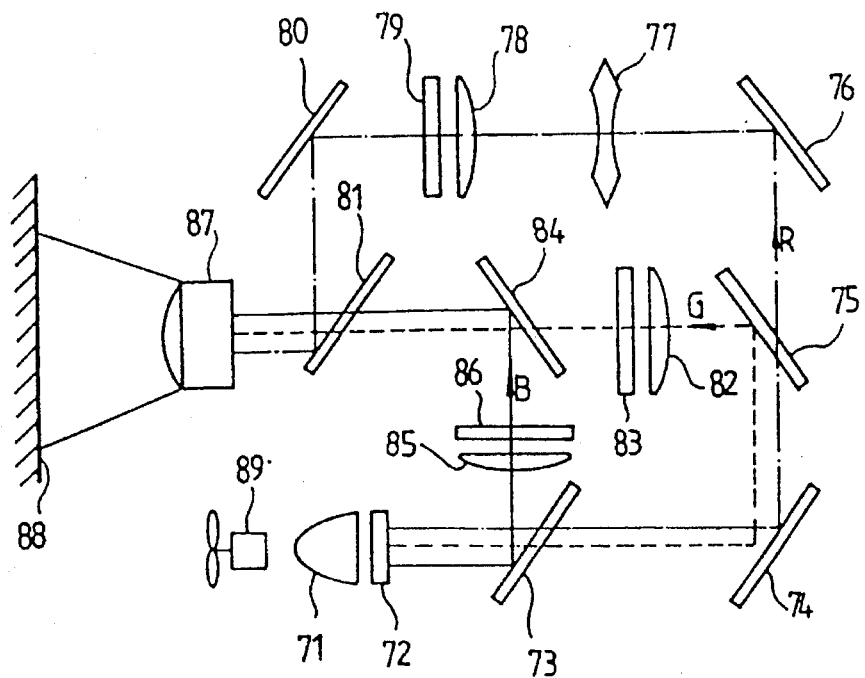

FIG. 7 shows still another embodiment of the liquid crystal projector of the present invention.

The apparatus of FIG. 7 comprises a light source 71 placed near screen 88 inside the liquid crystal projector for generating white light, a plurality of reflecting mirrors 74, 76 and 80, first and third dichroic mirrors 73 and 84 having the light transmittance characteristic of FIG. 1E, a second dichroic mirror 75 having the light transmittance characteristic of FIG. 1D, and a fourth dichroic mirror 81 having the light transmittance characteristic of FIG. 1C. Further, the projector has a projection lens 87 for adjusting the focus of the light projected on screen 88, three LC panels 79, 83 and 86 for individually modulating the light intensity of blue light (B), green light (G) and red light (R) obtained from the splitting of the white light, and three condensers 78, 82 and 85 for controlling the proceeding direction of light passing therethrough.

The dichroic mirrors are disposed in such a manner that when the projected light from light source 71 is reflected and transmitted via first dichroic mirror 73, the transmitted light of first dichroic mirror 73 is reflected and transmitted via second dichroic mirror 75, the reflected light of first dichroic mirror 73 is reflected by third dichroic mirror 84 to reach fourth dichroic mirror 81, the transmitted light of second dichroic mirror 75 is reflected by second and third total reflecting mirrors 76 and 80 to reach fourth dichroic mirror 81, and the reflected light of second dichroic mirror 75 is transmitted via third and fourth dichroic mirrors 84 and 81. Transparent LC panels 83, 86 and 79 and condensers 82, 85 and 78 are arranged between second and third dichroic mirrors 75 and 84, between first and third dichroic mirrors 73 and 84, and between second and third total reflecting mirrors 76 and 80, respectively. A correction lens 77 is placed between second total reflecting mirror 76 and condenser 78 and an optical filter 72 for transmitting visible light only is disposed between light source and first dichroic mirror 73. A fan 89 is provided on the side of light source 71 that is closest to the screen. A projection lens 87 is located between fourth dichroic mirror and screen 88.

Accordingly, the paths of the color light components projected from light source lamp 71 are as follows. Red light (R) reaches fourth dichroic mirror 81 via dichroic mirrors 73 and 75 and total reflecting mirrors 74, 76 and 80. Green light (G) passes first dichroic mirrors 73, first total reflecting mirror 74, second dichroic mirror 75 and third dichroic mirror 84 in sequence, to reach fourth dichroic mirror 81. Blue light (B) passes first dichroic mirror 73 and third dichroic mirror 84 in sequence, to reach fourth dichroic mirror 81.

While the invention has been described with respect to the above preferred embodiment, it is understood that various modification can be effected concerning, for example, the arrangement of the dichroic mirrors of FIGS. 1B–1E, without departing from the spirit and scope of this invention.

As described above, the liquid crystal projector of the present invention uses dichroic mirrors which can be manufactured relatively inexpensively, thereby decreasing production cost. Further, the location of the light source is appropriately chosen so that the heat produced thereby is not exhausted toward the user and the apparatus is miniaturized.

What is claimed is:

1. A liquid crystal projector which splits white light projected from a light source into first, second, and third color light components, light-intensity modulates said color light components, and synthesizes the light components to project the synthesized light components onto a screen, comprising:

first and third dichroic mirrors for transmitting only the first color light component and reflecting the second and third color light components;

a second dichroic mirror for reflecting only the third color light component and transmitting the first and second color light components; and a fourth dichroic mirror for synthesizing the light components color-split by said first through third dichroic mirrors to send the synthesized light components to a projection lens, wherein, said first through fourth dichroic mirrors are disposed in such a manner that the projected light from said light source is reflected and transmitted via said first dichroic mirror, reflected light of said first dichroic mirror is transmitted and reflected by said second dichroic mirror, the reflected light of said second dichroic mirror reaches said fourth dichroic mirror, the transmitted light of said second dichroic mirror is reflected by said third dichroic mirror to reach said fourth dichroic mirror, and the transmitted light of said first dichroic mirror is transmitted via said third dichroic mirror to reach said fourth dichroic mirror, wherein all of said dichroic mirrors separate one color light component from the other two color light components, said other two color light components being spectrally adjacent.

2. A liquid crystal projector as claimed in claim 1, wherein a reflecting mirror is placed on the light path between said first and third dichroic mirrors.

3. A liquid crystal projector as claimed in claim 1, wherein a reflecting mirror is placed on the light path between said second and fourth dichroic mirrors.

4. A liquid crystal projector as claimed in claim 2, wherein the first color light component is blue light, the second color light component is green light, and the third light component is red light.

5. A liquid crystal projector as claimed in claim 4, wherein said fourth dichroic mirror has a light transmittance characteristic in which only the red light component is reflected and the remaining color light components are transmitted.

6. A liquid crystal projector as claimed in claim 5, wherein said first and third dichroic mirrors have the same light transmittance characteristic.

7. A liquid crystal projector as claimed in claim 5, wherein said second and fourth dichroic mirrors have the same light transmittance characteristic.

8. A liquid crystal projector as claimed in claim 4, wherein said fourth dichroic mirror has a light transmittance characteristic in which only the red light component is transmitted and the remaining color light components are reflected.

9. A liquid crystal projector as claimed in claim 1 further comprising a correction lens for correcting the proceeding direction of light on a light path.

10. A liquid crystal projector as claimed in claim 2, wherein said light source is located in a space outside the optical system wherein boundaries of the optical system are defined by a perimeter passing through said first and second dichroic mirrors and said fourth dichroic mirror and said reflecting mirror.

11. A liquid crystal projector as claimed in claim 10, wherein said space outside the optical system is placed near the screen.

12. A liquid crystal projector as claimed in claim 1, wherein the first color light component is red light, the second color light component is green light, and the third light component is blue light.

13. A liquid crystal projector as claimed in claim 12, wherein said fourth dichroic mirror has a light transmittance characteristic in which only the blue light component is reflected and the remaining color light components are transmitted.

14. A liquid crystal projector as claimed in claim 12, wherein said fourth dichroic mirror has a light transmittance characteristic in which only the blue light component is transmitted and the remaining color light components are reflected.

15. A liquid crystal projector which splits white light projected from a light source into first, second, and third color light components, light-intensity modulates the color light components, and synthesizes the color light components to project the synthesized light components onto a screen, comprising:

first and third dichroic mirrors for reflecting only the first color light component and transmitting the second and third color light components;

a second dichroic mirror for transmitting only the third color light component and reflecting the first and second color light components; and a fourth dichroic mirror for synthesizing the light components color-split by said first, second, and third dichroic mirrors to send the synthesized light components to a projection lens, wherein, said dichroic mirrors are disposed in such a manner that the projected light from said light source is reflected and transmitted via said first dichroic mirror, the reflected light of said first dichroic mirror is reflected by said third dichroic mirror, the transmitted light of said first dichroic mirror is reflected and transmitted via said second dichroic mirror, the reflected light of said second dichroic mirror is transmitted via said third dichroic mirror to reach said fourth dichroic mirror, and the transmitted light of said first dichroic mirror reaches said fourth dichroic mirror, wherein all of said dichroic mirrors separate one color light component from the other two color light components, said other two color light components being spectrally adjacent.

* * * * *